United States Patent [19]
Arpentinier

[11] Patent Number: 5,356,213
[45] Date of Patent: Oct. 18, 1994

[54] PROCESS AND APPARATUS FOR MIXING TWO GASES

[75] Inventor: Philippe Arpentinier, Paris, France

[73] Assignee: L'Air Liquide, Societe Anonyme Pour L'Etude Et L'Exploitation Des Procedes Georges Claude, Paris, France

[21] Appl. No.: 39,685

[22] Filed: Feb. 11, 1993

Related U.S. Application Data

[63] Continuation of Ser. No. 731,013, Jul. 16, 1991, abandoned.

[30] Foreign Application Priority Data

Jul. 27, 1990 [FR] France ........................... 90 09617

[51] Int. Cl.⁵ ........................................... B01F 15/02
[52] U.S. Cl. ........................................ 366/178; 366/338
[58] Field of Search ............... 366/101, 107, 150, 165, 366/167, 173, 174, 177, 178, 336, 337, 338; 137/896, 897, 898

[56] References Cited

U.S. PATENT DOCUMENTS

| | | | |
|---|---|---|---|
| 2,816,518 | 12/1957 | Daggett | 137/896 |
| 3,249,341 | 5/1966 | Stanford | 366/336 |
| 3,675,901 | 7/1972 | Rion | 366/178 |
| 3,734,111 | 5/1973 | McClintock | 366/174 |
| 3,818,938 | 6/1974 | Carson | 366/178 |
| 4,007,969 | 2/1977 | Aubin et al. | 366/107 |
| 4,038,186 | 7/1977 | Potter et al. | 366/165 |
| 4,258,782 | 3/1981 | Kao | 366/338 |
| 4,344,752 | 8/1982 | Gallagher, Jr. | 137/896 |
| 4,474,477 | 10/1984 | Smith et al. | 366/165 |
| 4,487,553 | 12/1984 | Nagata | 417/171 |
| 4,519,423 | 5/1985 | Ho et al. | 366/167 |
| 4,521,117 | 6/1985 | Ouwerkerk et al. | 366/165 |
| 4,623,521 | 11/1986 | Gravley et al. | 366/336 |
| 4,674,888 | 6/1987 | Carlson | 366/101 |
| 4,761,077 | 8/1988 | Werner | 366/165 |
| 4,850,702 | 7/1989 | Arribau et al. | 366/165 |
| 4,869,595 | 9/1989 | Lang | 366/137 |
| 5,131,757 | 7/1992 | Smith | 366/165 |

FOREIGN PATENT DOCUMENTS

| | | | |
|---|---|---|---|
| 0237175 | 12/1964 | Austria | 366/107 |
| 0377088 | 7/1990 | European Pat. Off. | |
| 2729449 | 1/1979 | Fed. Rep. of Germany | |
| 59-39331 | 3/1984 | Japan | |
| 0924391 | 4/1963 | United Kingdom | 366/107 |

*Primary Examiner*—David A. Scherbel
*Assistant Examiner*—Reginald L. Alexander
*Attorney, Agent, or Firm*—Young & Thompson

[57] ABSTRACT

The injection of a second gas, in a flow of a first gas which flows in a portion of a main channel, is carried out by an ejection head which is coaxial with respect to the axis of the channel portion and causes a deflection, typically by radial vanes, of the second gas in at least two flows which are directed substantially radially towards the outside, with a tangential component. Application for example to the over-oxygenation of air in processes of oxidation in gas phase.

14 Claims, 1 Drawing Sheet

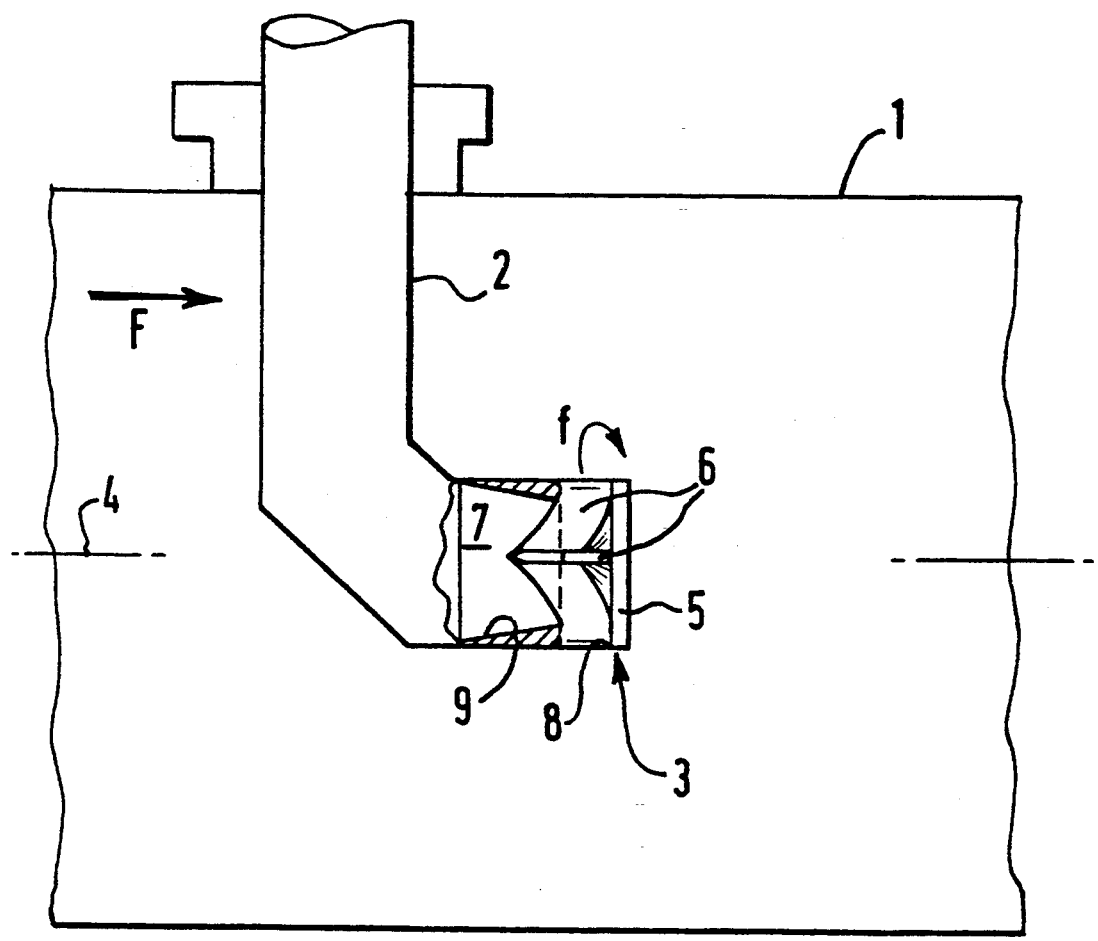

PROCESS AND APPARATUS FOR MIXING TWO GASES

This application is a continuation, of application Ser. No. 07/731,013, filed Jul. 16, 1991, now abandoned.

BACKGROUND OF THE INVENTION (a) Field of the Invention

The present invention concerns processes and apparatuses for mixing two gases by injection of a second gas, in a flow of a first gas which flows in a portion of a channel.

(b) Description of Prior Art

The known processes and apparatuses of this type are all involved with an axial co-ejection of the second gas into the first gas. Even by providing the channel portion with means for producing flurries in the flow of the first gas, the distance, downstream of the injection of the second gas, to obtain a substantially homogeneous mixture of the two gases is relatively long, which requires a straight length of the corresponding channel portion, which is often incompatible with the requirements of compactness of the devices where such a mixture is carried out. On the other hand, in the case of mixtures of certain gases, more particularly oxygen in a flow of air to over-oxygenate the latter, the non-homogenization which has been observed along the distance abovementioned does not enable to prevent the formation of local subconcentrations of the gas injected, such as in the vicinity of the walls of the channel portion, which may present major risks in the case where the second gas consists of oxygen.

SUMMARY OF INVENTION

It is an object of the present invention to propose a process and an apparatus enabling to obtain, in reliable fashion, with increased safety, a homogeneous mixture of the two gases along a very short distance downstream of the zone of injection, while avoiding local over-concentrations, in this short mixing zone, of the second injected gas.

For this purpose, according to a characteristic of the process according to the invention, the second gas is injected in the flow of the first gas perpendicularly to the direction of the flow of the first gas, in at least two flows which are substantially outwardly radially directed with a tangential component with respect to the axis of the channel portion.

According to a characteristic of the apparatus according to the invention, the second gas is injected via a duct including an ejection end which is coaxial with respect to the axis of the channel portion of the first gas and deviates the second gas in least two flows which are substantially outwardly radially directed, typically by means of at least two radial ducts between a central inlet section and peripheral outlet sections which are coaxial to the axis, the radial ducts being advantageously bound by vanes in which at least the exterior radial part is inclined with respect to the tangent plane of the corresponding outlet section.

BRIEF DESCRIPTION OF DRAWINGS

Other characteristics and advantages of the present invention will appear from the description which follows of an embodiment, given by way of illustration but without limitation, with respect to the annexed drawing, in which:

The single FIGURE is a schematic illustration in longitudinal cross-section, partly cut out, of a device adapted to carry out the process according to the invention.

DESCRIPTION OF PREFERRED EMBODIMENTS

The single FIGURE illustrates a mixing device according to the invention which is more particularly suitable for the over-oxygenation of a flow of air for an oxidation process in gas phase in the field of petrochemistry. On this FIGURE, there is a linear channel section of large diameter 1 through which circulates a flow F of a first gas, such as air. A duct 2 for a second gas to be injected, such as oxygen, radially penetrates into this channel. This duct 2, which is made of stainless steel, is shaped as an elbow and is terminated by an end part 3 which is coaxial to axis 4 of the channel portion 1. The end part 3 has its downstream end hidden by means of a transverse cloth 5. Angularly distributed vanes 6, arranged in the manner of the vanes of a centrifugal compressor, define ducts between an upstream inlet section 7, and angularly distributed peripheral outlet sections 8. More specifically, to accelerate the second gas in the injection head 3, the inlet section 7 includes a taper 9 connected to the vanes 6.

The number of vanes 6 may vary, depending on the gases to be mixed and their speed flows. In the case of an over-oxygenation of air, this number is higher than 6 and may advantageously be between 8 and 16, with shortened intermediate vanes. According to an aspect of the invention, the vanes 6 have a foot section substantially radial, then are tangentially curved towards the exterior, by forming at the outlet, an angle which is advantageously comprised between 30° and 45°, with respect to a corresponding tangent plane to deliver an outlet flow f of the second gas having a tangential component at the outlet of the injection head 3 so as to produce a rotation movement of the second gas which is injected around the axis of the main channel portion 1, which movement, combined with the axial flow of the main flow F causes the formation, downstream of the ejection head, of a rapidly widening toroidal nucleus in which the two gases are rapidly found to be intimately mixed in the required proportions.

In the embodiment which has been illustrated, the air channel 1 has a diameter of about 1 meter, for a flow of air F having a flow in the order of 500 to 400 tons/hour, the diameter of the injection head being of the order of 5 to 20 cm, for a flow of oxygen to be injected of the order of 4 to 20 tons/hour, depending on whether a low over-oxygenation is wanted or a stronger over-oxygenation is needed. Typically, the speed of ejection of the second gas (flow f) is higher than the speed if the main flow F, in the example described 30 meters/second for the injection flow f and 20 meters/second for the main flow F.

As mentioned above, the process and apparatus according to the invention are particularly efficient for the mixing of two gases of slightly different molecular masses, such as for the over-oxygenation of air, and find many applications in petrochemistry, for example for the manufacture of dichloroethane by oxychlorination of ethylene, the manufacture of ethylene oxide and ethylene glycol by epoxidation of ethylene, the manufacture of acrylonitrile by aminoxidation of propylene, or the manufacture of maleic anhydride by oxidation of N-butane; in refining, for example for the doping of regenerators of catalytic cracking, or for the enrichment of air in the CLAUS processes; in chemistry, for example for the manufacture of oxygenated water by the ethylhydroanthraquinone process, the oxidation of $SO_2$ into $SO_3$, the manufacture of nitric acid by oxidation of ammonia, or more generally all the important processes of oxidation intended to produce metallic oxides, these different products using an over-oxygenation between 2 and 12% of a main flow of air.

The process and the apparatus according to the invention also have applications, in chemistry or petrochemistry, for the production of reaction gaseous premixtures. Finally, the process and the apparatus according to the invention may be used for the homogenization of mixtures of fine powders, the two gases to be mixed, possibly identical, being loaded with particles of different powders, which are mixed in the gas mixtures, and are then collected in a separator with low charge losses.

Although the present invention has been described with respect to specific embodiments, it is not limited thereto, but, on the contrary, modifications and variants are possible as will appear to one skilled in the art.

I claim:

1. Device for mixing two gases, including a channel portion having an axis in which a first gas flows, and a duct opening in the channel portion to inject a second gas therein, the duct including an ejection end which is coaxial to the axis and deflects the second gas in at least two flows which are substantially radially outwardly directed, wherein the ejection end includes at least two substantially radial angularly spaced ducts between an inlet central section and peripheral outlet sections which are coaxial to the axis and wherein the radial ducts are bound by stationary swirled vanes in which at least the exterior radial part is inclined with respect to the tangent plane of the corresponding outlet section.

2. The device of claim 1, wherein the ejection end includes an intermediate portion defining an inner channel coaxial to the axis and converging towards the vanes.

3. The device of claim 1, wherein the channel portion is linear.

4. The device of claim 2, wherein the ejection end includes not less than 6 vanes.

5. A method for mixing a first gas stream flowing in a pipe section having an axis with a second gas comprising the steps of:
carrying a main flow of the second gas in an injection pipe located centrally within the pipe section and terminating by an injector end having stationary swirled radially extending vanes,
increasing the speed of the main flow of the second gas upstream of said vanes,
injecting substantially radially outwardly from an injection zone within the pipe section at least two angularly spaced streams of the second gas within the first gas stream, and
imparting to each stream of the second gas a rotating movement relative to the axis, said rotating movement being imparted by said stationary swirled radially extending vanes.

6. A method for mixing a first gas stream flowing in a pipe section having an axis with a second gas comprising the steps of: injecting substantially radially outwardly from an injection zone within the pipe section at least two angularly spaced streams of the second gas within the first gas stream, and imparting to each stream of the second gas a rotating movement relative to the axis, said rotating movement being imparted by stationary swirled radially extending vanes.

7. The method of claim 6, wherein a main flow of the second gas is carried by an injection pipe located centrally within the pipe section and terminating by an injector end including said vanes.

8. The method of claim 6, wherein the first and second gas have a first and second molecular weights which are close one to each other.

9. The method of claim 6, wherein the second gas is oxygen.

10. The method of claim 9, wherein the first gas is air.

11. The method of claim 6, wherein the first gas stream and second gas are loaded with powder particles to be mixed.

12. The method of claim 11, wherein the first and second gas are the same gas.

13. The method of claim 10, wherein the mass flow rate of air is about 450 tons per hour and the mass flow rate of oxygen is between 4 and 20 tons per hour.

14. The method of claim 6, wherein the ejection speed of each of the two streams of the second gas is greater than the speed of the first gas stream flowing in the pipe section.

* * * * *